United States Patent [19]

Yasue et al.

[11] Patent Number: 4,779,492
[45] Date of Patent: Oct. 25, 1988

[54] TWIN TYPE HYDRAULIC PRESSURE CONTROL DEVICE WITH INDIVIDUAL LINE PRESSURE REGULATION VALVES FOR TWO STAGE AUTOMATIC TRANSMISSION

[75] Inventors: Hideki Yasue; Kagenori Fukumura, both of Toyota, Japan

[73] Assignee: Toyota Jidosha Kabushiki Kaisha, Toyota, Japan

[21] Appl. No.: 934,799

[22] Filed: Nov. 25, 1986

[30] Foreign Application Priority Data

Dec. 4, 1985 [JP] Japan ................. 60-272792

[51] Int. Cl.⁴ ............................ B60K 41/06
[52] U.S. Cl. ..................... 74/869; 74/752 C
[58] Field of Search ............ 74/861, 867, 868, 869, 74/752 C

[56] References Cited

U.S. PATENT DOCUMENTS

| | | | |
|---|---|---|---|
| 3,895,542 | 7/1975 | Miyauchi | 74/868 |
| 4,033,203 | 7/1977 | Hirosawa et al. | 74/869 |
| 4,324,156 | 4/1982 | Iwanaga et al. | 74/868 X |
| 4,369,571 | 1/1983 | Matsumoto et al. | 74/869 X |
| 4,480,505 | 11/1984 | Takano et al. | 74/869 |
| 4,481,877 | 11/1984 | Takano et al. | 74/869 X |
| 4,663,992 | 5/1987 | Fujiura et al. | 74/869 |

FOREIGN PATENT DOCUMENTS

| | | | |
|---|---|---|---|
| 56-138020 | 10/1981 | Japan. | |
| 58-128929 | 8/1983 | Japan. | |
| 2031078 | 4/1980 | United Kingdom | 74/867 |

Primary Examiner—Leslie A. Braun
Assistant Examiner—Dwight G. Diehl
Attorney, Agent, or Firm—Oblon, Fisher, Spivak, McClelland & Maier

[57] ABSTRACT

This hydraulic pressure transmission control device is for a vehicle with a transmission system which has, in series in the specified order in the rotational force transmission path, a first transmission mechanism which can be set to any one of several speed stages according to selective supply of hydraulic fluid pressures, and a second transmission mechanism which similarly can be set to any one of several speed stages according to selective supply of hydraulic fluid pressures. It includes a first hydraulic fluid pressure control device which has a first line pressure control valve for supplying it with a first line pressure for being then selectively supplied to the first transmission mechanism as its selective supply of hydraulic fluid pressures; and a second hydraulic fluid pressure control device which has a second line pressure control valve for supplying it with a second line pressure for being then selectively supplied to the second transmission mechanism as its selective supply of hydraulic fluid pressures. Thereby the first and second line pressures can be independently determined according to circumstances. Particularly, the second line pressure control valve may increase the line pressure which it supplies, the lower is the engaged speed stage of the first transmission mechanism, and/or the lower is the engaged speed stage of the second transmission mechanism, and/or the higher is the value of a parameter representing the load on the engine.

5 Claims, 4 Drawing Sheets

«TWIN TYPE HYDRAULIC PRESSURE CONTROL DEVICE WITH INDIVIDUAL LINE PRESSURE REGULATION VALVES FOR TWO STAGE AUTOMATIC TRANSMISSION»

BACKGROUND OF THE INVENTION

1. Field of the Invention

The present invention relates to a hydraulic pressure control device for an automatic transmission system, and more particularly relates to such a hydraulic pressure control device which is particularly suitable for a twin type automatic transmission system which incorporates first and second transmission mechanisms arranged in series in the rotational force transmission path.

2. Description of the Prior Art

In the prior art, there have been proposed various types of automatic transmission systems which incorporate first and second transmission mechanisms arranged in series in the rotational force transmission path, i.e. with the second transmission mechanism receiving the output of the first transmission mechanism and further transmitting it, particularly in Japanese Patent Laying Open Publications Ser. Nos. 56-138020 (1981) and 58-128929 (1983), neither of which is it intended hereby to admit as prior art to the present patent application except to the extent in any case required by applicable law.

Conventionally, in such a twin type transmission system in which the first and the second transmission mechanisms are both hydraulic type transmissions such as gear transmission mechanisms which are set to their various speed stages by selective supply of actuating hydraulic fluid pressures to various friction actuating mechanisms incorporated in them such as hydraulic clutches and hydraulic brakes, the actuating pressures which are thus selectively supplied to both the first transmission mechanism and also the second transmission mechanism are provided by switching the same line pressure by appropriate control mechanisms such as hydraulic valves. In other words, the two hydraulic fluid pressure control devices for the first and the second transmission mechanisms are conventionally both provided with the same line pressure from one and the same line pressure control valve.

There is however a problem with such a twin type transmission system, in that, in the typical case that the second transmission mechanism is provided in the power transmission path after the first transmission mechanism and thus receives a supply of rotational power from said first transmission mechanism, the torque acting upon the friction engaging mechanisms such as the hydraulic clutches and the hydraulic brakes of said second transmission mechanism is not only determined by the load on the vehicle engine, but also fluctuates depending on the engaged speed stages both of the first transmission mechanism and also of the second transmission mechanism. In other words, even if the engine load is substantially constant, when the first transmission mechanism is set to a relatively low speed stage, the torque on the friction engaging mechanisms such as the hydraulic clutches and the hydraulic brakes of said second transmission mechanism is higher than when said first transmission mechanism is set to a relatively high speed stage. Accordingly, in the above outlined conventional case that the supply of line hydraulic fluid pressure for being switched for providing the actuating hydraulic fluid pressures for the various friction engaging mechanisms of said second transmission mechanism is the same supply as the supply of line hydraulic fluid pressure for being switched for providing the actuating hydraulic fluid pressures for the various friction engaging mechanisms of said first transmission mechanism, and in the conventional case that the pressure value of said line pressure does not vary according to engagement of the speed stages of either of said transmission mechanisms (although it may vary with engine load), the problem arises that the supply of line hydraulic fluid pressure for said second transmission mechanism is sometimes unsuitable, even if it is appropriate for said first transmission mechanism. This can lead to slippage of said friction engaging mechanisms, thus deteriorating the performance of the transmission, reducing its reliability, and shortening its service life.

As a means of compensating for this problem, it has been conceived of to appropriately increase the number of plates in the friction engaging mechanisms of the second transmission mechanism, in order to increase the torque transmission capability thereof. This can certainly remove all problems relating to shortage of torque transmission capability in said friction engaging mechanisms of the second transmission mechanism, but at the price of increasing the size and weight and cost of said second transmission mechanism. Such a concept is accordingly not very economically feasible.

SUMMARY OF THE INVENTION

The inventors of the present invention have considered the various problems detailed above, from the point of view of the desirability of providing appropriate actuating pressures for both the first transmission mechanism and also the second transmission mechanism of such a twin type transmission system.

Accordingly, it is the primary object of the present invention to provide a hydraulic pressure control device for an twin type automatic transmission system incorporating first and second transmission mechanisms arranged in series in the power transmission path, which avoids the problems detailed above.

It is a further object of the present invention to provide such a hydraulic pressure control device for such an automatic transmission system, which prevents any shortage of actuating hydraulic fluid pressure for the various friction engaging devices of the first and second transmission mechanisms.

It is a further object of the present invention to provide such a hydraulic pressure control device for such an automatic transmission system, which always supplies appropriate and adequate actuating pressures to said friction engaging devices of said first and second transmission mechanisms.

It is a further object of the present invention to provide such a hydraulic pressure control device for such an automatic transmission system, which ensures against slippage of said friction engaging devices of said first and second transmission mechanisms.

It is a further object of the present invention to provide such a hydraulic pressure control device for such an automatic transmission system, which maximizes transmission reliability.

It is a further object of the present invention to provide such a hydraulic pressure control device for such an automatic transmission system, which maximizes transmission service life.

It is a further object of the present invention to provide such a hydraulic pressure control device for such an automatic transmission system, which does not require the friction engaging devices of the second transmission mechanism to be made as unduly large or bulky or weighty.

It is a further object of the present invention to provide such a hydraulic pressure control device for such an automatic transmission system, which does not require any extra plates to be provided in the friction engaging devices of the second transmission mechanism.

It is a yet further object of the present invention to provide such a hydraulic pressure control device for such an automatic transmission system, which minimizes cost of component parts.

It is a yet further object of the present invention to provide such a hydraulic pressure control device for such an automatic transmission system, which minimizes cost of assembly.

It is a yet further object of the present invention to provide such a hydraulic pressure control device for such an automatic transmission system, which allows said transmission system to be made compact and light in weight.

According to the most general aspect of the present invention, these and other objects are attained by, for a transmission system for a vehicle incorporating an engine, comprising, in series in the specified order in the rotational force transmission path, a first transmission mechanism which can be set to any one of a plurality of speed stages according to selective supply of hydraulic fluid pressures, and a second transmission mechanism which similarly can be set to any one of a plurality of speed stages according to selective supply of hydraulic fluid pressures: a hydraulic pressure transmission control device, comprising: a first hydraulic fluid pressure control device, comprising a first line pressure control valve for supplying said first hydraulic fluid pressure control device with a first line pressure for being then selectively supplied by said first hydraulic fluid pressure control device to said first transmission mechanism as its said selective supply of hydraulic fluid pressures; and: a second hydraulic fluid pressure control device, comprising a second line pressure control valve for supplying said second hydraulic fluid pressure control device with a second line pressure for being then selectively supplied by said second hydraulic fluid pressure control device to said second transmission mechanism as its said selective supply of hydraulic fluid pressures.

According to such a hydraulic pressure transmission control device as specified above, since the line pressures for the first and the second transmission mechanisms are produced from the separate first and second line pressure control valves, therefore they can be set appropriately for each of said first and second transmission mechanisms without any compromise having to be made between them, and accordingly this hydraulic pressure control device can prevent any shortage of actuating hydraulic fluid pressure for the various friction engaging devices of the first and second transmission mechanisms, and can always supply appropriate and adequate actuating pressures to said friction engaging devices of said first and second transmission mechanisms. Thus, slippage of said friction engaging devices of said first and second transmission mechanisms is ensured against, and transmission reliability and transmission service life are maximized. Further, this is done without requiring the friction engaging devices of the second transmission mechanism to be made unduly large or bulky or weighty, i.e. without requiring any extra plates to be provided in the friction engaging devices of said second transmission mechanism. Accordingly, the cost of component parts is minimized, as is the cost of assembly, and said transmission system is allowed to be made compact and light in weight.

According to a particular specialization of the present invention, the above and other objects may more particularly be accomplished by such a hydraulic pressure transmission control device as first specified above, wherein said second line pressure control valve of said second hydraulic fluid pressure control device comprises means for increasing the line pressure which it supplies, the lower is the speed stage of said first transmission mechanism which is engaged. This is an appropriate way of altering the line pressure for the second transmission mechanism. Alternatively or concurrently, according to another particular specialization of the present invention, the above and other objects may more particularly be accomplished by such a hydraulic pressure transmission control device as thus specified above, wherein said second line pressure control valve of said second hydraulic fluid pressure control device comprises means for increasing the line pressure which it supplies, the lower is the speed stage of said second transmission mechanism which is engaged. This also can be an appropriate manner of line pressure alteration. Finally, alternatively or concurrently, according to another particular specialization of the present invention, the above and other objects may more particularly be accomplished by such a hydraulic pressure transmission control device as thus specified above, wherein said second line pressure control valve of said second hydraulic fluid pressure control device comprises means for increasing the line pressure which it supplies, the higher is the value of a parameter representing the load on said engine.

BRIEF DESCRIPTION OF THE DRAWINGS

The present invention will now be described with respect to the preferred embodiment thereof, and with reference to the illustrative drawings appended hereto, which however are provided for the purposes of explanation and exemplification only, and are not intended to be limitative of the scope of the present invention in any way, since this scope is to be delimited solely by the accompanying claims. With relation to the figures, spatial terms are to be understood as referring only to the orientation on the drawing paper of the illustrations of the relevant parts, unless otherwise specified; like reference numerals, unless otherwise so specified, denote the same parts and gaps and spaces and so on in the various figures; and:

DESCRIPTION OF THE PREFERRED EMBODIMENT

The present invention will now be described with reference to the preferred embodiment thereof, and with reference to FIGS. 1 through 5.

OVERALL TRANSMISSION SYSTEM CONSTRUCTION

Figure 1:
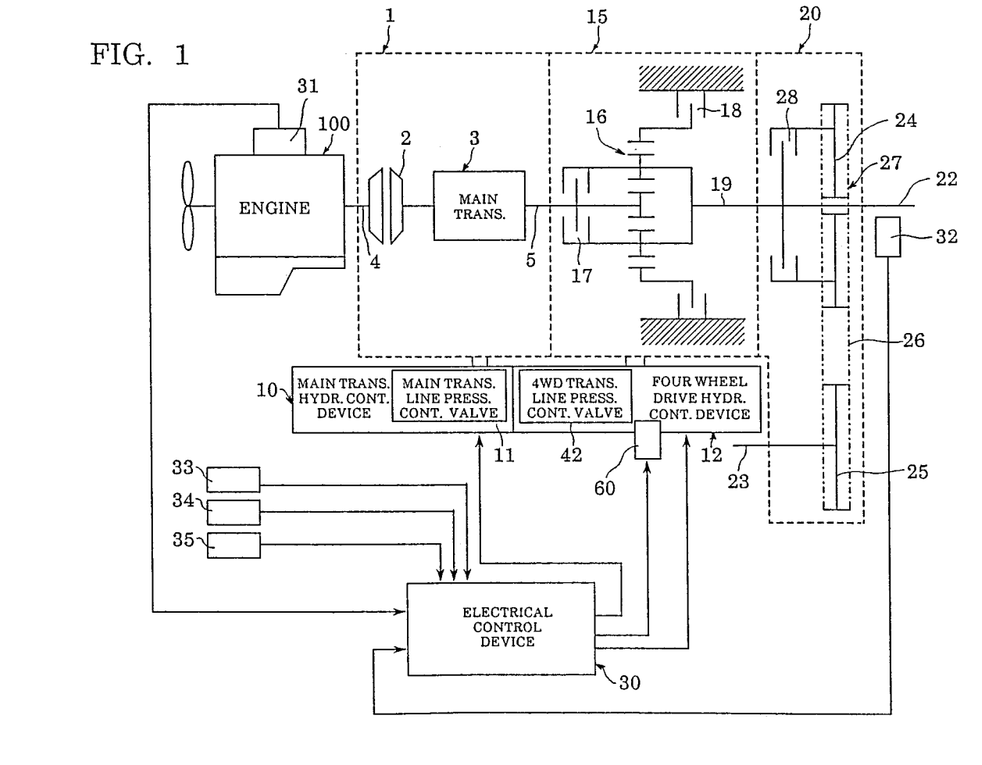
FIG. 1 is a schematic skeleton diagram showing a vehicle four wheel drive transmission system which comprises an automatic transmission device and a two wheel drive / four wheel drive switchover device with a control clutch, and which incorporates the preferred embodiment of the hydraulic pressure transmission control device of the present invention.

FIG. 1 shows in schematic part block diagrammatical view a vehicle four wheel drive transmission system, as well as an internal combustion engine denoted by the reference numeral 100 of an automotive vehicle not otherwise shown. This engine 100 is mounted longitudinally in an engine room formed in the body of said automotive vehicle, the front of said vehicle being to the left as seen in the figure and the rear of said vehicle being to the right, and the aforesaid four wheel drive transmission system comprises, in series in the specified order from the engine 100: an automatic transmission device 1, provided as directly coupled to and behind said engine 100 and incorporating a torque converter 2 of a per se known type whose rotational power input shaft 4 is rotationally driven from the crank shaft of said engine 100, and a main gear transmission mechanism 3 whose rotational power input shaft is rotationally driven from the rotation power output shaft of said torque converter 2; and a four wheel drive device 15, similarly provided as directly coupled to and behind said automatic transmission device 1, with its rotational power input shaft being rotationally driven from the rotational power output shaft of said main gear transmission mechanism 3. As will be seen later, this four wheel drive device 15 comprises a two stage auxiliary gear transmission mechanism 16 and a two wheel drive / four wheel drive (hereinafter abbreviated as "2WD/4WD") switchover device 20.

In more detail, the rotational power produced by the internal combustion engine 100 is transmitted through the torque converter 2, with a certain degree of slippage and torque amplification being applied thereto as is per se conventional, to the gear transmission mechanism 3. This gear transmission mechanism 3 is of a per se conventional type, being settable to provide a plurality, exemplarily four in this preferred embodiment, of forward speed stages, i.e. values of speed reduction and torque amplification, and one reverse speed stage between its rotational power input member and its rotational power output member, according to control of said gear transmission mechanism 3 provided by selective supply of hydraulic fluid pressures from a main transmission hydraulic control device 10. Typically, this gear transmission mechanism 3 may incorporate various selectively engagable friction engaging mechanisms such as clutches and brakes, supply of said hydraulic fluid pressures to selective ones of which engages them for providing the various speed stages, and planetary gear mechanisms or the like for providing various different degrees of rotational power reduction and amplification gearing; the details of these matters will not be particularly discussed herein.

The four wheel drive device 15 incorporates a planetary gear wheel type two stage auxiliary gear transmission mechanism 16 for providing either a directly connected speed stage or a speed reduction speed stage. This auxiliary gear transmission mechanism 16 may, as schematically shown in the figure, incorporate a sun gear, a ring gear, a plurality of planetary pinions fitted between said sun gear and said ring gear and meshed with both of them and performing planetary motion between them in a per se known manner, and a carrier to which said planetary pinions are rotationally mounted and which is rotationally coupled to the aforementioned rotational power output shaft 19 of this auxiliary gear transmission mechanism 16 so as to be rotationally driven thereby. Selectively, either the ring gear may be rotationally connected to the casing of this auxiliary gear transmission mechanism 16 by a brake 18, or the carrier may be connected to the sun gear by a clutch 17; this clutch 17 and this brake 18 are selectively operated by selective supply of hydraulic fluid pressures from a four wheel drive hydraulic control device 12, as will be described shortly. Thereby, the auxiliary gear transmission mechanism 16 is caused to provide either a directly connected speed stage or a speed reduction speed stage.

The rotational power output shaft of the auxiliary gear transmission mechanism 16 is connected to the rotational power input member of the 2WD/4WD switchover device 20. This 2WD/4WD switchover device 20 has a rear wheel drive output shaft 22 for driving the rear wheels of the vehicle, the forward end of which is always connected to the aforesaid rotational power input member of this 2WD/4WD switchover device 20; and the other end of this rear wheel drive shaft 22 is connected, via a universal joint device or the like and via a propeller shaft to a differential device (none of these devices are particularly shown) for distributing rotational power between the rear wheels (also not shown) of the vehicle. On the other hand, the aforesaid rotational power input member 19 of this 2WD/4WD switchover device 20 is also selectively rotationally connected, via a selectively engagable hydraulic clutch 28, a drive sprocket 24 connected to the rotational power output member of said clutch 28, an endless drive chain 26 which picks up drive from said drive sprocket 24, and a driven sprocket 25 which receives drive from said endless drive chain 26, to a front wheel drive shaft 23. This front wheel drive shaft 23 is connected, via another universal joint device or the like and a front propeller shaft, to a differential device (none of these devices are particularly shown) for distributing rotational power between the front wheels (also not shown) of the vehicle. This front wheel drive shaft 23 extends forwards along and underneath the four wheel drive device 15 and the automatic transmission device 1 generally longitudinally to the vehicle body. Thereby, according to control of the hydraulic clutch 28, the 2WD/4WD switchover device 20 can either supply the rotational power which it receives via the rotational power output shaft 19 only to the rear wheels of the vehicle, or both to the front and to the rear wheels of the vehicle. This hydraulic clutch 28 is engaged by selective supply of hydraulic fluid pressure from the aforementioned four wheel drive hydraulic control device 12, and its engagement pressure and accordingly the maximum torque value which it can transmit without slipping substantially increase along with increase of said supplied hydraulic fluid pressure.

The main transmission hydraulic control device 10 incorporates a main transmission line hydraulic fluid pressure control valve 11, which is of a per se known construction, and, as can be seen more particularly with reference to FIG. 2 which will be explained hereinafter, receives a supply of pressurized hydraulic fluid from a hydraulic fluid pump 41 which picks up said hydraulic fluid from a sump 40, and bleeds a certain amount of said pressurized hydraulic fluid back to the sump 40 so as to regulate the pressure of the remainder thereof to a main transmission line pressure value which is determined according to the current value of the throttle opening of the engine 1, which is taken as representative of the current value of the load on said engine 1. This main transmission line pressure is transmitted by the main transmission hydraulic control device 10 to selective combinations of the hydraulic fluid pressure friction engaging means such as hydraulic clutches and hydraulic brakes incorporated in the main gear transmission mechanism 3, for controlling said main gear transmission mechanism 3 to be engaged to one or the other of its various speed stages, according to control signals which said main transmission hydraulic control device 10 receives from an electrical control device 30 which will be described hereinafter.

Further, the four wheel drive hydraulic control device 12 incorporates a four wheel drive line hydraulic fluid pressure control valve 42, which can be seen more particularly with reference to FIG. 2 which will be explained hereinafter, and which receives supply of pressurized hydraulic fluid from said hydraulic fluid pump 41 which picks up said hydraulic fluid from said sump 40, and bleeds a certain amount of said pressurized hydraulic fluid back to said sump 40 so as to regulate the pressure of the remainder thereof to a four wheel drive line pressure value which is determined according to the current value of the throttle opening of the engine 1, which is taken as representative of the current value of the load on said engine 1. This four wheel drive line pressure is transmitted by the four wheel drive hydraulic control device 12 either to the clutch 17 but not to the brake 18, or alternatively to the brake 18 but not to the clutch 17, for controlling the auxiliary gear transmission mechanism 16 to be engaged either to its directly connected speed stage or to its speed reducing speed stage, according to control signals which this four wheel drive hydraulic control device 12 receives from an electrical control device 30 which will be described hereinafter. In fact, the electrical control device 30 selectively engages one or the other of said clutch 17 and said brake 18 according to the set position of a low/high selection switch 34, which is mounted in the passenger compartment of the vehicle so as to be accessed by the driver to be set, and which dispatches an electrical output signal representative of its said set position to said electrical control device 30. Also, this four wheel drive line pressure is transmitted by said four wheel drive hydraulic control device 12 either to engage the hydraulic clutch 28 of the 2WD/4WD switchover device 20, or to release said hydraulic clutch 28, according again to a control signal which the four wheel drive hydraulic control device 12 receives from said electrical control device 30 which will now be described.

The operations of the main transmission hydraulic control device 10 for the main gear transmission mechanism 3 and of the four wheel drive hydraulic control device 12 for the four wheel drive device 15 are controlled by a electrical control device 30 for the transmission system as a whole, which dispatches control signals (which typically may be electrical signals) to said hydraulic control devices 10 and 12. The full structure and functioning of this electrical control device 30 for controlling the hydraulic control devices 10 and 12 and thereby controlling the main gear transmission mechanism 3 and the four wheel drive device 15 will not be described herein, since they are not directly germane to the present invention, and since the details thereof could vary over any of a wide variety of possibilities. This electrical control device 30 receives: a signal representative of the current value of the throttle opening of the internal combustion engine 100 from an engine throttle opening sensor 31 mounted to said engine 100; a signal representative of the current value of the road speed of the vehicle (in fact a signal representing the rotational speed of the rear wheel drive output shaft 22) from a vehicle road speed sensor 32; a signal representative of the current set position of a manually operated transmission range setting level (not particularly shown) which is mounted in the passenger compartment of the vehicle so as to be accessed by the driver to be set for setting transmission operating range (such as "P" or parking range, "R" or reverse range, "N" or neutral range, "D" or drive range, or "L" or low range) from a manual shift range detection sensor 33; as previously mentioned, a signal representative of the current set position of the manually operated low/high selection switch 34 mounted in the passenger compartment of the vehicle; and a signal representative of the current set position of a manually operated 4WD/2WD selection switch 35 mounted in the passenger compartment of the vehicle. Exemplarily and typically although this is not mandatory for the present invention, the electrical control device 30 controls the engaged speed stage of the gear transmission mechanism 3 according to the current values of vehicle road speed, engine throttle opening, and transmission set range, by following certain internally stored data such as shift range diagrams and so on. And, exemplarily and typically although this is not mandatory for the present invention, this electrical control device 30 incorporates a microcomputer which obeys a control program, and incorporates various A/D and D/A converters which supply data to and output data from said microcomputer; this preferred construction for the electrical control device 30 will be assumed in the following.

Now, a particular exemplary construction for the four wheel drive line hydraulic fluid pressure control valve 42 incorporated in the four wheel drive hydraulic control device 12, as utilized in this preferred embodiment of the hydraulic pressure control device of the present invention, will be described with reference to FIG. 2 which shows a schematic longitudinal sectional view thereof, also shows the main transmission line hydraulic fluid pressure control valve 11 for the main transmission hydraulic control device 10 in block diagrammatical form, and further shows a hydraulic control circuit 70 for controlling the auxiliary gear transmission mechanism 16 and the 2WD/4WD switchover device 20 also in block diagrammatical form.

In detail, therefore, the oil pump 41 picks up hydraulic fluid from the sump 40 and compresses it, then supplying the thus compressed hydraulic fluid to the conduit 71. The conduit 71 supplies this compressed hydraulic fluid to the previously described (and per se conventional) main transmission line hydraulic fluid pressure control valve 11 for the main transmission hydraulic control device 10, and also supplies said compressed hydraulic fluid to an input port 46 of the four wheel drive line hydraulic fluid pressure control valve 42.

This four wheel drive line hydraulic fluid pressure control valve 42 is structured as a spool valve which has a bore formed in a housing. In the upper portion of said bore as seen in FIG. 2 there is slidably fitted a pressure control valve spool element 43, while in the lower portion of said bore as seen in FIG. 2 there is slidably fitted a line pressure adjustment valve spool element 44; said valve spool elements 43 and 44 thus being coaxial. And between said valve spool elements 43 and 44 there is fitted a compression coil spring 55, which thus biases said valve spool elements 43 and 44 away from one another in the valve bore, i.e. biases the pressure control valve spool element 43 in the upward direction as seen in FIG. 2 and biases the line pressure adjustment valve spool element 44 in the downward direction as seen in FIG. 2.

The pressure control valve spool element 43 is the one that actually performs the regulation of line pressure. As shown in FIG. 2, said pressure control valve spool element 43 is formed with three lands denoted as 90, 91, and 92 in the figure, and the portion of the valve bore in which said pressure control valve spool element 43 slides is formed with five ports: the previously mentioned input port 46, a drain port 47, a control port 51, and two output ports 48 and 49. In detail, the input pressure from the intermediate point of the conduit 71 is supplied to the input port 46 between the lands 91 and 92 of the pressure control valve spool element 43, and, if the land 91 is low enough in the valve bore to clear the lower lip in the figure of the barrier portion between this input port 46 and the drain port 47, some of said input pressure is let past said lower lip to be drained through said drain port 47. In any event, the pressure present around the cutaway of the pressure control valve spool element 43 between its lands 91 and 92 is taken out from the output port 48 via a throttling element 93, and is supplied as an output regulated line pressure to the output conduit 72, as well as being fed back to the control port 51, which opens to a pressure chamber defined at the top of the four wheel drive line hydraulic fluid pressure control valve 42 between its end and the upper end in the figure of the pressure control valve spool element 43. Thereby, as will be understood by one of ordinary skill in the transmission valve art based upon these explanations and the figure, the pressure control valve spool element 43 oscillates to and fro about an intermediate position, so as to regulate the pressure in the output conduit 72 to an output line pressure value which is determined by the biasing force supplied to the lower end of said pressure control valve spool element 43, i.e. by the biasing force exerted by the compression coil spring 55. The other output port 49 is provided for, if the pressure control valve spool element 43 should become very far displaced in the downwards direction in the valve bore, venting the inputted pressure to the conduit 72 by bypassing the throttling element 93, thus avoiding that the pressure control valve spool element 43 should be even further driven downward in the valve bore. This output line pressure in the conduit 72 is supplied to the hydraulic control circuit 70 for controlling the auxiliary gear transmission mechanism 16 and the 2WD/4WD switchover device 20.

Now, the biasing force exerted by the compression coil spring 55, which as above explained determines the output line pressure value which is generated in the output conduit 72, is determined by the degree of compression of said compression coil spring 55, which depends upon the axial position of its lower extremity which is supported by the line pressure adjustment valve spool element 44. This axial position of the lower extremity of the compression coil spring 55 is in turn determined by a balance between the upward force exerted by the line pressure adjustment valve spool element 44 on said lower extremity of said compression coil spring 55 and the biasing force of said compression coil spring 55.

Figure 2:
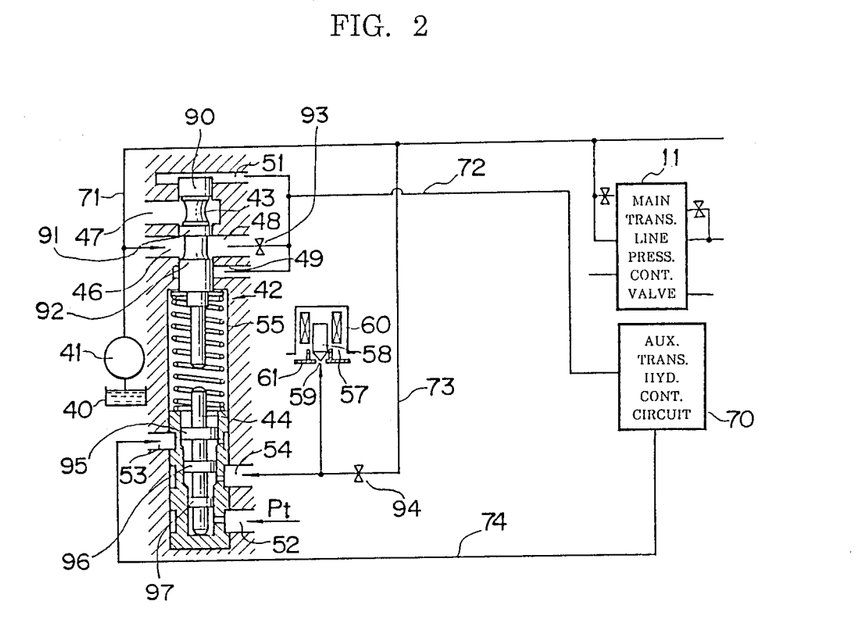
FIG. 2 shows a four wheel drive line hydraulic fluid pressure control valve in detailed schematic longitudinal sectional view and a main transmission line hydraulic fluid pressure control valve and a hydraulic control circuit for an auxiliary gear transmission mechanism both in block diagrammatical view, all said elements being incorporated in the FIG. 1 preferred embodiment hydraulic pressure transmission control device of the present invention.
Figure 3:
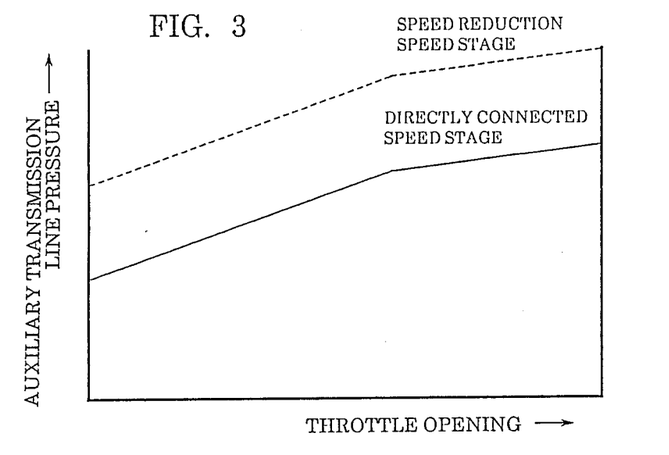
FIG. 3 is a graph, in which throttle pressure is shown along the horizontal axis and line pressure is shown along the vertical axis, for explanation of the behavior of an auxiliary transmission line pressure with respect to change of a throttle pressure, for a fixed value of a control pressure, in the two cases of said auxiliary gear transmission mechanism being in its speed reduction speed stage as shown by a dashed line, and being its directly connected speed stage as shown by a solid line.

As shown in FIG. 2, said line pressure adjustment valve spool element 44 is formed with three lands denoted as 95, 96, and 97 in the figure, and the portion of the valve bore in which said line pressure adjustment valve spool element 44 slides is formed with three input ports: a throttle pressure port 52 opening to a throttle pressure chamber defined at the lower end in the figure of the line pressure adjustment valve spool element 44 between its land 97 and the end of the valve bore; a control pressure port 54 opening to a control pressure chamber defined at a lower intermediate point of the line pressure adjustment valve spool element 44 between its land 97 and its land 96 which is larger in diameter than said land 97; and a low/high pressure port 53 opening to a low/high pressure chamber defined at an upper intermediate point of said line pressure adjustment valve spool element 44 between its land 96 and its land 95 which is in turn larger in diameter than said land 96. In detail, the throttle pressure produced from a throttle pressure valve, not shown in the figures but of a per se known type which produces an output pressure which varies according to the amount of depression of a throttle pedal of the vehicle incorporating the engine 100—said throttle pedal depression amount being taken as representative of engine load—is fed to the throttle pressure port 52, so as to impel the line pressure adjustment valve spool element 44 in the upward direction with a biasing force proportional to the pressure value of said throttle pressure; the line pressure present in the conduit 71 is fed via a conduit 73 and a throttle element 94 to the control pressure port 54 and is modulated by the duty ratio action of an electromagnetic solenoid valve 60 connected to an intermediate point along said conduit 73, as will be described later, so as to produce a control pressure and so as to impel the line pressure adjustment valve spool element 44 in the upward direction with a biasing force proportional to the pressure value of said control pressure; and a certain low/high pressure value is supplied from the hydraulic control circuit 70 via a conduit 74 to the low/high pressure port 53, when said hydraulic control circuit 70 is controlling the auxiliary gear transmission mechanism 16 to be in its speed reduction speed stage (its so called low speed stage), but not when said hydraulic control circuit 70 is controlling the auxiliary gear transmission mechanism 16 to be in its directly connected speed stage, so as to impel the line pressure adjustment valve spool element 44 in the upward direction with a certain characteristic biasing force when and only when said hydraulic control circuit 70 is controlling the auxiliary gear transmission mechanism 16 to be in its said speed reduction speed stage.

Thus, in each case with others of the stated parameters being the same, the auxiliary transmission line pressure outputted to the hydraulic control circuit 70 via the conduit 72 by this four wheel drive line hydraulic fluid pressure control valve 42: by the action of the throttle pressure fed to the port 52, is greater, the greater is the value of the load on the engine 100; by the action of the low/high pressure value fed to the low/high pressure port 53, is greater when the auxiliary gear transmission mechanism 16 is in its speed reduction speed stage then when said auxiliary gear transmission mechanism 16 is in its directly connected speed stage; and, by the action of the control pressure fed to the control pressure port 54, is greater when said control pressure is high, than when said control pressure is low. The behavior of said auxiliary transmission line pressure with respect to change of the throttle pressure, for a fixed value of the control pressure, is shown in the two cases of the auxiliary gear transmission mechanism 16 being in its speed reduction speed stage and in its directly connected speed stage in the FIG. 3 graph, in which throttle pressure is shown along the horizontal axis and line pressure is shown along the vertical axis.

Figure 4:
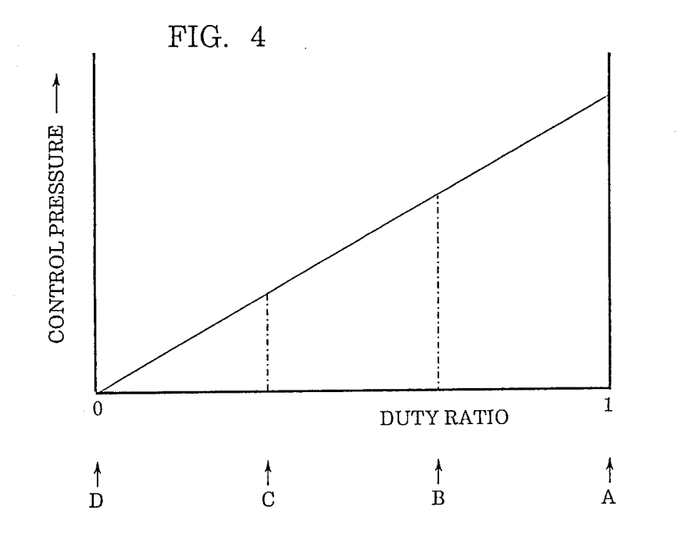
FIG. 4 is another graph, in which duty ratio is shown along the horizontal axis and said control pressure is shown along the vertical axis, showing an exemplary behavior of variation of said control pressure with the duty ratio of a pulse electrical signal supplied to a coil of an electromagnetic solenoid valve.

Now, the action of this control pressure will be explained. A point on the conduit 73 downstream of the throttling element 94 is connected via a conduit to a valve port 59 which is controlled by the conical tip portion of a valve element 58. When a coil 60 is not supplied with actuating electrical energy from the previously mentioned electrical control device 30, then by the biasing action of a compression coil spring 61 the tip of said valve element 58 is biased away from said valve port 59, thus opening said valve port 59 and communicating the conduit 73 (downstream of the throttling element 94) to drain, thereby lowering the pressure in said conduit 73 and at the control pressure port 54. On the other hand, when said coil 60 is supplied with actuating electrical energy from the previously mentioned electrical control device 30, then against the biasing action of the compression coil spring 61 which is overcome the tip of said valve element 58 is pushed towards said valve port 59, thus closing said valve port 59 and discommunicating the conduit 73 (downstream of the throttling element 94) from drain, thereby raising the pressure in said conduit 73 and at the control pressure port 54. According therefore to the duty ratio of a pulse electrical signal supplied to said coil 60 from the electrical control device 30, the pressure at the control pressure port 54 is controlled; and when said duty ratio is close to unity said pressure at the control pressure port 54 is relatively high, thus increasing the line pressure produced by the four wheel drive line hydraulic fluid pressure control valve 42 and supplied to the conduit 72 for the four wheel drive device 15; but, when on the other hand said duty ratio is close to zero said pressure at the control pressure port 54 is relatively low, thus decreasing the line pressure produced by the four wheel drive line hydraulic fluid pressure control valve 42 and supplied to the conduit 72 for the four wheel drive device 15. An exemplary graph for the behavior of variation of this control pressure with the duty ratio of the pulse electrical signal supplied to the coil 60 is shown in FIG. 4, in which duty ratio is shown along the horizontal axis and said control pressure is shown along the vertical axis.

OPERATION

Figure 5:
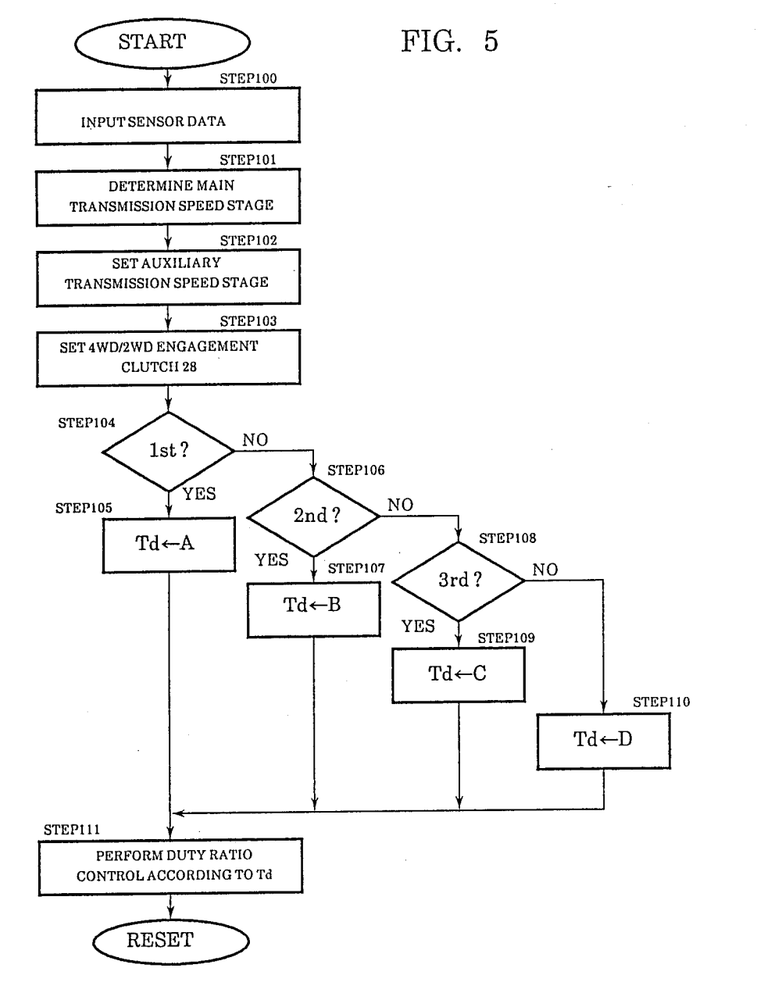
FIG. 5 is a flow chart for explaining a fragment of the flow of a program stored in and obeyed by a micro computer incorporated in a electrical control device which cooperates with the preferred embodiment of the hydraulic pressure transmission control device of the present invention, as comprised in the vehicle four wheel drive transmission system shown in FIG. 1.

In FIG. 5 of the drawings there is shown a flow chart of a fragment of a program executed by the aforesaid microprocessor incorporated in the electrical control device 30 utilized together with the preferred embodiment of the hydraulic pressure transmission control device of the present invention, as comprised in the vehicle four wheel drive transmission system shown in FIG. 1. This program fragment is performed frequently during vehicle operation, as for example every time the crank shaft of the internal combustion engine 100 rotates through a determinate rotational angle.

After the START block, then, in the step 100, the data from the various sensors is inputted, and then the flow of control passes next to the step 101.

In the step 101, an appropriate speed stage for the main gear transmission mechanism 3 is determined by the microcomputer, in a per se conventional manner according, for example, to the current value of vehicle road speed as outputted by the vehicle road speed sensor 32, according to the current value of vehicle throttle opening as outputted by the engine throttle opening sensor 31, and according to the currently set range for the transmission (such as "P" or parking range, "R" or reverse range, "N" or neutral range, "D" or drive range, or "L" or low range) set on the manual shift range detection sensor 33; and then the flow of control passes next to the step 102.

In the step 102, according to the currently set position of the manually operated low/high selection switch 34 mounted in the passenger compartment of the vehicle, selectively the line pressure produced in the conduit 72 by the four wheel drive line hydraulic fluid pressure control valve 42 is dispatched by the hydraulic control circuit 70 either to the clutch 17 or to the brake 18, the other one of said devices being drained, so as to set the auxiliary gear transmission mechanism 16 to the appropriate and desired one of its directly connected speed stage and its speed reducing speed stage; and then the flow of control passes next to the step 103.

In the step 103, according to the signal representative of the current set position of the manually operated 4WD/2WD selection switch 35 mounted in the passenger compartment of the vehicle, selectively said line pressure produced in the conduit 72 by the four wheel drive line hydraulic fluid pressure control valve 42 either is dispatched by the hydraulic control circuit 70 to the hydraulic clutch 28 of the 2WD/4WD switchover device 20, or not, so as to set the 2WD/4WD switchover device 20 to the appropriate and desired one of its four wheel driving operational condition and its two wheel drive operational condition; and then the flow of control passes next to the decision step 104.

In the decision step 104, a decision is made as to whether or not the main gear transmission mechanism 3 is currently in its first speed stage. If the result of this decision is YES, so that said main gear transmission mechanism 3 is indeed in its first speed stage, then the flow of control passes next to the step 105; but, if the result of this decision is NO, so that said main gear transmission mechanism 3 is not in fact in its first speed stage, then the flow of control passes next to the decision step 106.

In the decision step 106, a decision is made as to whether or not the main gear transmission mechanism 3 is currently in its second speed stage. If the result of this decision is YES, so that said main gear transmission mechanism 3 is indeed in its second speed stage, then the flow of control passes next to the step 107; but, if the result of this decision is NO, so that said main gear transmission mechanism 3 is not in fact in its second speed stage, then the flow of control passes next to the decision step 108.

In the decision step 108, a decision is made as to whether or not the main gear transmission mechanism 3 is currently in its third speed stage. If the result of this decision is YES, so that said main gear transmission mechanism 3 is indeed in its third speed stage, then the flow of control passes next to the step 109; but, if the result of this decision is NO, so that said main gear transmission mechanism 3 is not in fact in its third speed stage and therefore must now be in its fourth speed stage, then the flow of control passes next to the step 110.

In the step 105, since it is at this point in the flow chart established that the main gear transmission mechanism 3 is currently in its first speed stage, the duty ratio Td of the pulse electrical signal which is to be supplied to the coil 60 from the electrical control device 30 is set to a value A as exemplarily shown in FIG. 4, for example to its maximum value such as unity; and then the flow of control passes next to the step 111.

In the step 107, since it is at this point in the flow chart established that the main gear transmission mechanism 3 is currently in its second speed stage, the duty ratio Td of the pulse electrical signal which is to be supplied to the coil 60 from the electrical control device 30 is set to a value B as exemplarily shown in FIG. 4, for example to an intermediate value therefor; and then again the flow of control passes next to the step 111.

In the step 109, since it is at this point in the flow chart established that the main gear transmission mechanism 3 is currently in its third speed stage, the duty ratio Td of the pulse electrical signal which is to be supplied to the coil 60 from the electrical control device 30 is set to a value C as exemplarily shown in FIG. 4, for example to an intermediate value therefor; and then again the flow of control passes next to the step 111.

In the step 110, since it is at this point in the flow chart established (by elimination) that the main gear transmission mechanism 3 is currently in its fourth speed stage, the duty ratio Td of the pulse electrical signal which is to be supplied to the coil 60 from the electrical control device 30 is set to a value D as exemplarily shown in FIG. 4, for example to its minimum value such as zero; and then again the flow of control passes next to the step 111.

In the step 111, duty factor control for the pulse electrical signal supplied to the coil 60 from the electrical control device 30 is performed according to the value for Td determined as explained above, according to the currently engaged speed stage of the main gear transmission mechanism 3, so that the control pressure supplied to the control pressure port 54 of the four wheel drive line hydraulic fluid pressure control valve 42 is modulated according to said currently engaged speed stage of the main gear transmission mechanism 3, and then the flow of control passes next to exit this program via the RESET box, without doing anything further.

Thus, by the above described control program, the control pressure supplied to the control pressure port 54 of the four wheel drive line hydraulic fluid pressure control valve 42 is modulated according to the currently engaged speed stage of the main gear transmission mechanism 3, and in fact is increased the lower is said currently engaged speed stage of said main gear transmission mechanism 3. Thereby the line pressure produced in the conduit 72 by the four wheel drive line hydraulic fluid pressure control valve 42 and supplied to the four wheel drive device 15 is increased, the lower is said currently engaged speed stage of said main gear transmission mechanism 3.

Thus, in summary, the line pressure produced by the four wheel drive line hydraulic fluid pressure control valve 42 and supplied to the four wheel drive device 15 is increased as the load on the engine 100 (the throttle opening) is increased, and is also increased, for a given engine load, the lower is the currently engaged speed stage of the main gear transmission mechanism 3, and is further also increased, for given values of the engine load and the currently engaged speed stage of the main gear transmission mechanism 3, when the auxiliary gear transmission mechanism 16 is in its speed reducing speed stage, as compared to its value when said auxiliary gear transmission mechanism 16 is in its directly connected speed stage. Thus, in summary, the line pressure supplied to the clutch 17 or the brake 18 of the auxiliary gear transmission mechanism 16 for engaging it is always controlled to be appropriate for the current value of the torque which is being applied to said friction engaging members. According, the size of said friction engaging members can be minimized, and their service life is enhanced while keeping the transmission as a whole light and compact and cheap. In other words, since, according to such a hydraulic pressure transmission control device as described above, the line pressures for the main gear transmission mechanism 3 and the four wheel drive device 15 are produced from the separate line pressure control valves 11 and 42, therefore they can be set appropriately for each of said transmission mechanisms without any compromise having to be made between them, and accordingly this hydraulic pressure control device can prevent any shortage of actuating hydraulic fluid pressure for the various friction engaging devices of the two transmission mechanisms, and can always supply appropriate and adequate actuating pressures to said friction engaging devices of said two transmission mechanisms. Thus, slippage of said friction engaging devices of said two transmission mechanisms is ensured agains, and transmission reliability and transmission service life are maximized. Further, this is done without requiring the friction engaging devices of the four wheel drive device 15 to be made unduly large or bulky or weighty, i.e. without requiring any extra plates to be provided in the friction engaging devices such as the clutch 17, the clutch 28 or the brake 18 of said four wheel drive device 15.

Although the present invention has been shown and described in terms of the preferred embodiment thereof, and with reference to the appended drawings, it should not be considered as being particularly limited thereby, since the details of any particular embodiment, or of the drawings, could be varied without, in many cases, departing from the ambit of the present invention. For example, the present invention is not to be considered as being limited to the case of a four wheel drive type transmission system, but also could be applied to the case of a compound type automatic transmission in which a normal type gear transmission mechanism and an overdrive type gear transmission mechanism were arranged in series. Accordingly, the scope of the present invention is to be considered as being delimited, not by any particular perhaps entirely fortuitous details of the disclosed preferred embodiment, or of the drawings, but solely by the scope of the accompanying claims, which follow.

What is claimed is:

1. For a transmission system for a vehicle incorporating an engine, comprising, in series along the rotational power transmission path, a first transmission mechanism which includes at least one friction engaging means and which can be set to any one of a plurality of speed stages according to selection of supply of a first hydraulic fluid pressure to said friction engaging means thereof, and a second transmission mechanism which includes at least one friction engaging means and which can be set to any one of a plurality of speed stages according to selection of supply of a second hydraulic fluid pressure to said friction engaging means thereof:

a hydraulic pressure transmission control device, comprising:

a first hydraulic fluid pressure control device comprising a first line pressure control valve for generating said first hydraulic fluid pressure; and a second hydraulic fluid pressure control device comprising a second line pressure control valve for generating said second hydraulic fluid pressure at a substantially higher pressure than said first hydraulic fluid pressure.

2. A hydraulic pressure transmission control device according to claim 1, wherein said second hydraulic fluid pressure control device comprises means for controlling said second line pressure control valve for increasing said second hydraulic fluid pressure, the lower a speed stage at which said first transmission mechanism is set.

3. A hydraulic pressure transmission control device according to claim 2, wherein said second hydraulic fluid pressure control device comprises means for controlling said second line pressure control valve for increasing said second hydraulic fluid pressure, the lower a speed stage at which said second transmission mechanism is set.

4. A hydraulic pressure transmission control device according to claim 1, wherein said second hydraulic fluid pressure control device comprises means for controlling said second line pressure control valve for increasing said second hydraulic fluid pressure, the lower a speed stage at which said second transmission mechanism is set.

5. A hydraulic pressure transmission control device according to any one of claims 1 through 3, wherein said second hydraulic fluid pressure control device comprises means for controlling said second line pressure control valve for increasing said second hydraulic fluid pressure, the higher the value of a parameter representing the load on said engine.

* * * * *